(12) United States Patent
Hashimoto et al.

(10) Patent No.: US 11,329,721 B2
(45) Date of Patent: May 10, 2022

(54) COMMUNICATION DEVICE, OPTICAL AXIS DIRECTION ADJUSTING METHOD, AND COMMUNICATION SYSTEM

(71) Applicant: TAMRON CO., LTD., Saitama (JP)

(72) Inventors: Yusuke Hashimoto, Saitama (JP); Nobuyuki Adachi, Saitama (JP); Koji Kawaguchi, Saitama (JP); Hirofumi Mochizuki, Saitama (JP); Keijiro Abe, Saitama (JP); Yuichi Imamiya, Saitama (JP); Hironori Taguchi, Saitama (JP)

(73) Assignee: TAMRON CO., LTD., Saitama (JP)

( * ) Notice: Subject to any disclaimer, the term of this patent is extended or adjusted under 35 U.S.C. 154(b) by 0 days.

(21) Appl. No.: 17/194,912

(22) Filed: Mar. 8, 2021

(65) Prior Publication Data

US 2021/0384971 A1 Dec. 9, 2021

(30) Foreign Application Priority Data

Jun. 9, 2020 (JP) .............................. JP2020-100314

(51) Int. Cl.
*H04B 10/112* (2013.01)
*G02B 15/00* (2006.01)

(52) U.S. Cl.
CPC ........... *H04B 10/112* (2013.01); *G02B 15/00* (2013.01)

(58) Field of Classification Search
None
See application file for complete search history.

(56) References Cited

U.S. PATENT DOCUMENTS

| | | | | | |
|---|---|---|---|---|---|
| 5,548,434 A | * | 8/1996 | Shimonaka | ........ | H04B 10/1125 398/192 |
| 5,594,580 A | * | 1/1997 | Sakanaka | ........... | H04B 10/1125 398/31 |
| 5,887,202 A | * | 3/1999 | Ohtake | ................. | G02B 7/102 396/86 |
| 7,190,905 B2 | * | 3/2007 | Sakanaka | ............. | H04B 10/118 398/129 |
| 7,220,064 B2 | * | 5/2007 | Mori | .................... | G02B 6/4206 385/74 |
| 8,200,094 B1 | * | 6/2012 | Zhovnirovsky | ...... | H04B 10/803 398/118 |
| 8,915,905 B2 | * | 12/2014 | Vogler | ..................... | G02B 3/14 606/4 |
| 2003/0223754 A1 | * | 12/2003 | Sakanaka | ............. | H04B 10/118 398/118 |
| 2006/0050412 A1 | * | 3/2006 | Ito | ........................... | G02F 1/167 359/745 |
| 2014/0064739 A1 | * | 3/2014 | Chen | ..................... | H04B 10/11 398/130 |

(Continued)

FOREIGN PATENT DOCUMENTS

| | | |
|---|---|---|
| JP | H08-163041 A | 6/1996 |
| JP | 2004-015135 A | 1/2004 |
| JP | 2005-086392 A | 3/2005 |

OTHER PUBLICATIONS

Martinez et al., Active optical zoom for laser communication, 2005 (Year: 2005).*

*Primary Examiner* — Jai M Lee
(74) *Attorney, Agent, or Firm* — Paratus Law Group, PLLC

(57) ABSTRACT

A communication device includes a zoom lens that collects signal light.

5 Claims, 4 Drawing Sheets

(56) References Cited

U.S. PATENT DOCUMENTS

| | | | |
|---|---|---|---|
| 2014/0161466 A1* | 6/2014 | Riza | H04B 10/1149 398/119 |
| 2015/0029387 A1* | 1/2015 | Kawai | H04N 5/23296 348/347 |
| 2015/0055078 A1* | 2/2015 | Johnstone | G02B 7/008 349/200 |

* cited by examiner

COMMUNICATION DEVICE, OPTICAL AXIS DIRECTION ADJUSTING METHOD, AND COMMUNICATION SYSTEM

CROSS-REFERENCE TO RELATED APPLICATIONS

This application is based on and claims the benefit of priority from Japanese Patent Application No. 2020-100314, filed on Jun. 9, 2020, the entire contents of which are incorporated herein by reference.

BACKGROUND OF THE INVENTION

Technical Field

The present invention relates to a communication device and a communication system that perform communicate using light. In addition, the present invention relates to an optical axis direction adjusting method in such a communication device.

Related Art

Expectations for high-speed wireless communication such as fifth generation wireless communication are increasing. In addition, attention is focused on technology that achieves a part of a high-speed wireless communication network by wireless communication using light (having a wavelength of 1 mm or less) instead of wireless communication using a radio wave (having a wavelength of 1 mm or more). Wireless communication using light is not restricted by the Radio Law unlike wireless communication using a radio wave. In addition, light has high straightness and is not radiated in all directions unlike a radio wave. Therefore, light is advantageous from a viewpoint of security. In particular, wireless communication using visible light is considered to have a low risk of unexpected interception. Wireless communication using light is not suitable for communication with a mobile station such as a mobile phone terminal, but is suitable for communication between fixed stations such as base stations and relay stations.

By the way, when wireless communication is performed using light, it is necessary to adjust an optical axis direction of an optical system in a communication device on a receiving side so as to match a direction in which a communication device on a transmitting side exists when viewed from the communication device on the receiving side. Examples of documents disclosing technology that adjusts the optical axis direction of the optical system in the communication device on the receiving side include Patent Literatures JP H8-163041 A, JP 2004-15135 A, and JP 2005-86392 A.

SUMMARY OF THE INVENTION

However, a communication device (communication device on a receiving side) including a lens for collecting signal light has the following problems. That is, when a lens having a short focal length (wide angle of view) is used as a lens for collecting signal light, it is easy to coarsely adjust an optical axis direction such that a light source of signal light (communication device on a transmitting side) is within an angle of view, but it is difficult to finely adjust the optical axis direction such that the center of the light source of the signal light coincides with the center of the angle of view. Meanwhile, when a lens having a long focal length (narrow angle of view) is used as a lens for collecting signal light, it is easy to finely adjust an optical axis direction such that the center of a light source of signal light coincides with the center of an angle of view, but it is difficult to coarsely adjust the optical axis direction such that the light source of the signal light is within the angle of view.

An aspect of the present invention has been achieved in view of the above problems, and an object thereof is to make both fine optical axis direction adjustment and coarse optical axis direction adjustment easy in a communication device including a lens for collecting signal light.

A communication device according to an aspect of the present invention includes a zoom lens having a variable focal length as a lens for collecting signal light.

According to an aspect of the present invention, by setting a focal length of a zoom lens to a small value (by setting an angle of view to a large value), coarse optical axis direction adjustment can be easily performed, and by setting the focal length of the zoom lens to a large value (by setting the angle of view to a small value), fine optical axis direction adjustment can be easily performed.

DESCRIPTION OF THE EMBODIMENTS

1. Configuration of Communication Device

Figure 1:
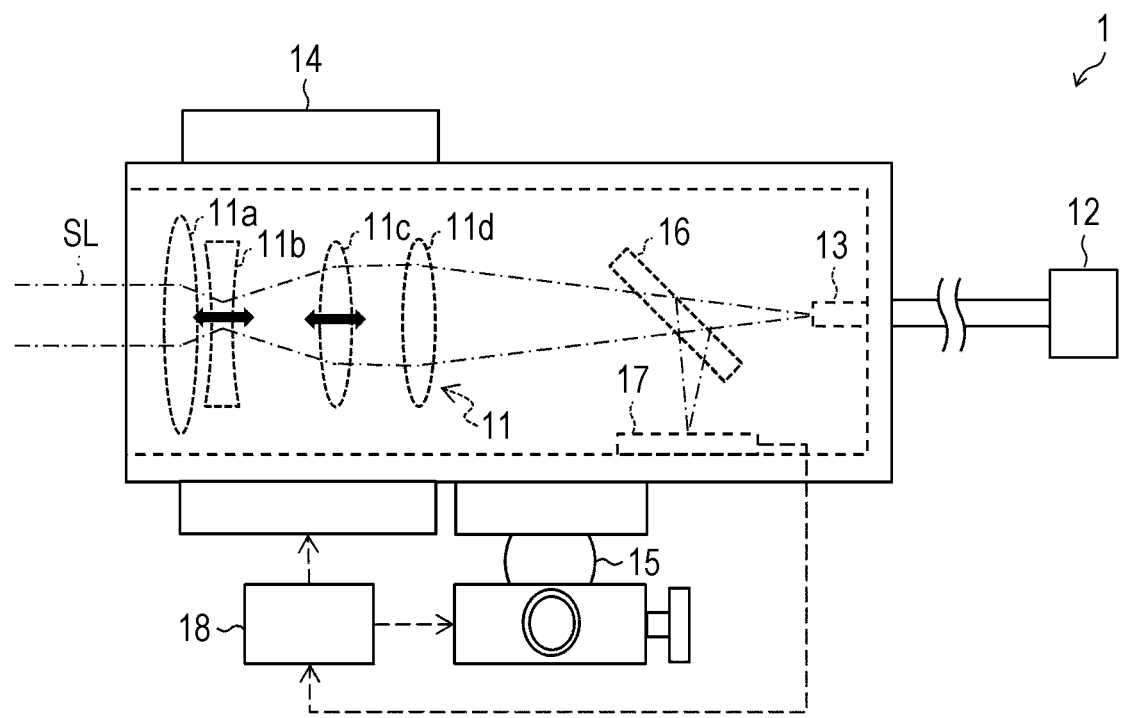
FIG. 1 is a side view illustrating a configuration of a communication device according to an embodiment of the present invention.

A configuration of a communication device 1 according to an embodiment of the present invention will be described with reference to FIG. 1. FIG. 1 is a side view illustrating the configuration of the communication device 1.

The communication device 1 is a device for receiving signal light SL, and includes a zoom lens 11, a receiving circuit 12, and an optical fiber 13, as illustrated in FIG. 1. The zoom lens 11 is a lens having a variable focal length for collecting the signal light SL. The receiving circuit 12 is a circuit for converting the signal light SL collected by the zoom lens 11 into an electric signal. In the present embodiment, light collected by the zoom lens 11 is guided to the receiving circuit 12 by the optical fiber 13. Note that the signal light SL may be visible light having a wavelength of 360 nm or more and less than 760 nm, or infrared light having a wavelength of 760 nm or more and 1 mm or less. When the wavelength of the signal light SL is 1000 nm or more and 1650 nm or less (more preferably 1290 nm or more and 1610 nm or less), it is easy to generate the signal light SL using a light source for optical communication such as a YAG laser.

In the present embodiment, as the zoom lens 11, an optical system including a focus group 11a, a variable magnification group 11b, a correction group 11c, and an imaging group 11d is used. Here, the focus group 11a, the correction group 11c, and the imaging group 11*d* each include one or more lenses and each have a positive refractive index. The variable magnification group 11*b* includes one or more lenses and has a negative refractive index. However, the configuration of the zoom lens 11 is arbitrary, and the present invention is not limited to the above configuration. For example, the zoom lens 11 may include a vibration-proof group (not illustrated). In this case, it as possible to suppress fluctuations at a focal position of the signal light SL, which may occur when the zoom lens 11 vibrates.

As illustrated in FIG. 1, the communication device 1 further includes a focal length adjusting mechanism 14 and an optical axis direction adjusting mechanism 15. The focal length adjusting mechanism 14 is a mechanism for adjusting a focal length of the zoom lens 11. The optical axis direction adjusting mechanism 15 is a mechanism for adjusting an optical axis direction of the zoom lens 11.

The present embodiment uses, as the focal length adjusting mechanism 14, a mechanism that adjusts a focal length of the zoom lens 11 by moving the variable magnification group 11*b* and the correction group 11*c* in an optical axis direction (for example, a cam mechanism). The present embodiment uses, as the optical axis direction adjusting mechanism 15, a mechanism that adjusts an optical axis direction of the zoom lens 11 by changing an elevation angle and an azimuth angle of a lens barrel accommodating the zoom lens 11 (for example, a platform). However, the configurations of the focal length adjusting mechanism 14 and the optical axis direction adjusting mechanism 15 are arbitrary, and the present invention is not limited to the above configurations.

As illustrated in FIG. 1, the communication device 1 further includes a half mirror 16, a signal light detector 17, and a control circuit 18. The half mirror 16 is an optical element for branching the signal light SL that has passed through the zoom lens 11 into transmission light and reflection light. The signal light detector 17 is a detector for detecting reflection light reflected by the half mirror 16 out of the signal light SL that has passed through the zoom lens 11. The control circuit 18 is a circuit for specifying a light source direction of the signal light SL with reference to an output signal of the signal light detector 17, and controlling the focal length adjusting mechanism 14 and the optical axis direction adjusting mechanism 15 based on the specified light source direction. Here, the light source direction of the signal light SL refers to a direction in which a light source of the signal light SL (for example, a communication device on a transmitting side) exists when viewed from the communication device 1. Note that transmission light that has passed through the half mirror 16 is input to the receiving circuit 12 via the optical fiber 13 out of the signal light SL that has passed through the zoom lens 11.

In the present embodiment, a two-dimensional image sensor such as a charge coupled device (CCD) is used as the signal light detector 17. Therefore, an output signal of the signal light detector 17 is an image including a light source of the signal light SL (a communication device that transmits the signal light SL) as a subject. When the focal length of the zoom lens 11 is changed by the focal length adjusting mechanism 14, the angle of view of this image changes. However, the configuration of the signal light detector 17 is arbitrary, and the present invention is not limited to the above configuration. For example, a set of photodiodes arranged in a matrix may be used as the signal light detector 17. When the optical system (for example, the zoom lens 11) included in the communication device 1 includes a vibration-proof group, the light source direction of the signal light SL can be specified by the position and/or direction of the vibration-proof group. In this case, instead of specifying the light source direction of the signal light SL with reference to an output signal of the signal light detector 17, the light source direction may be specified with reference to a signal indicating the position and/or direction of the vibration-proof group.

In the present embodiment, the control circuit 18 uses a circuit including a processor (computing device) such as a central processing unit (CPU), a main memory (main storage device) such as a semiconductor random access memory (RAM), and an auxiliary memory (auxiliary storage device) such as a hard disk drive (HDD). The processor controls the focal length adjusting mechanism 14 and the optical axis direction adjusting mechanism 15 by expanding a program stored in the auxiliary memory on the memory and executing a command included in the program expanded on the memory. However, the configuration of the control circuit 18 is arbitrary, and the present invention is not limited the above configuration.

In the present embodiment, the communication device 1 has a function of performing optical axis direction adjustment before starting communication. This optical axis direction adjustment is implemented by controlling the focal length adjusting mechanism 14 such that the focal length of the zoom lens 11 is shorter than the focal length during communication, and then controlling the optical axis direction adjusting mechanism 15 such that the optical axis direction of the zoom lens 11 approaches the light source direction of the signal light SL. The details of an optical axis direction adjusting method S1 in the communication device 1, implemented by control of the control circuit 18 will be described later with reference to another drawing.

2. Flow of Optical Axis Direction Adjusting Method

Figure 2:
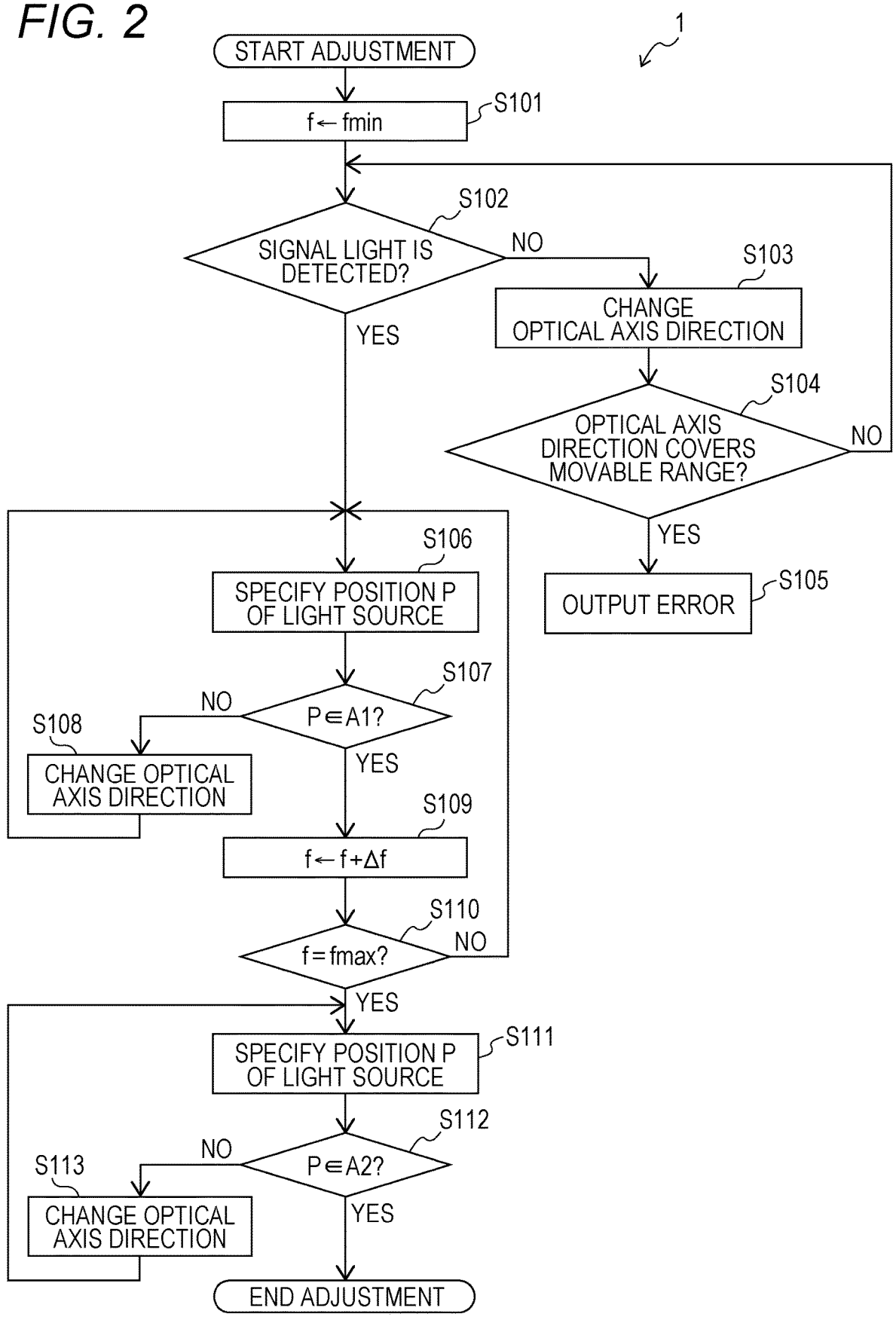
FIG. 2 is a flowchart illustrating a flow of an optical axis direction adjusting method in the communication device of FIG. 1.

A flow of the optical axis direction adjusting method S1 in the communication device 1 will be described with reference to FIG. 2. FIG. 2 is a flowchart illustrating the flow of the optical axis direction adjusting method S1 in the communication device 1.

The optical axis direction adjusting method S1 includes steps S101 to S113 described below.

Steps S101 to S105 are steps for setting the optical axis direction of the zoom lens 11 such that a light source of the signal light SL (hereinafter referred to as "signal light source") is included in an angle of view in a state where a focal length f of the zoom lens 11 is minimum (the angle of view is maximum).

Step S101 is a step in which the control circuit 18 controls the focal length adjusting mechanism 14 such that the focal length f of the zoom lens 11 is a minimum value fmin. Step S102 is a step in which the control circuit 18 determines whether or not the signal light source is included in the angle of view with reference to an output signal of the signal light detector 17. Step S103 is a step in which the control circuit 18 controls the optical axis direction adjusting mechanism 15 such that the optical axis direction of the zoom lens 11 changes by a predetermined angle. This step S103 is executed if "NO" is determined in the immediately preceding step S102. Step S104 is a step in which the control circuit 18 determines whether or not the optical axis direction of the zoom lens 11 covers a movable range. Step S105 is a step in which the control circuit 18 outputs an error message indicating that the signal light source cannot be included in the angle of view. This step S105 is executed if "YES" is determined in the immediately preceding step S104.

Steps S106 to S110 are steps for gradually bringing the optical axis direction of the zoom lens 11 closer to the light source direction of the signal light SL while gradually increasing the focal length f of the zoom lens 11 (gradually decreasing the angle of view).

Step S106 is a step in which the control circuit 18 specifies a position occupied by the signal light source in the angle of view (more accurately, a position occupied by the center of an image of the signal light source in an image represented by an output signal of the signal light detector 17) P with reference to the output signal of the signal light detector 17. The position occupied by the signal light source in the angle of view indicates a direction in which the signal light source exists when viewed from the communication device 1. Step S107 is a step in which the control circuit 18 determines whether or not the position P of the signal light source is included in a predetermined region A1 including the center of the angle of view. Step S108 is a step in which the control circuit 18 controls the optical axis direction adjusting mechanism 15 such that the optical axis direction of the zoom lens 11 changes by a predetermined angle. This step S108 is executed if "NO" is determined in the immediately preceding step S107. Note that the amount of change in the optical axis direction of the zoom lens 11 in step S108 is set to be smaller than the above-described amount of change in the optical axis direction of the zoom lens 11 in step S103. Step S109 is a step in which the control circuit 18 controls the focal length adjusting mechanism 14 such that the focal length f of the zoom lens 11 is increased by a predetermined increment $\Delta f$. This step S109 is executed if "YES" is determined in the immediately preceding step S107. Step S110 is a step in which the control circuit 18 determines whether or not the focal length f of the zoom lens 11 matches a maximum value fmax. Steps S106 to S109 are repeated until "YES" is determined in step S110.

Steps S111 to S113 are steps for further bringing the optical axis direction of the zoom lens 11 closer to the light source direction of the signal light SL in a state where the focal length f of the zoom lens 11 is maximum (the angle of view is minimum).

Step S111 is a step in which the control circuit 18 specifies the position P occupied by the signal light source in the angle of view with reference to an output signal of the signal light detector 17. Step S112 is a step in which the control circuit 18 determines whether or not the position P of the signal light source is included in a predetermined region A2 including the center of the angle of view. Note that the region A2 referred to in step S112 is a region smaller than the above-described region A1 referred to in step S107. Step S113 is a step in which the control circuit 18 controls the optical axis direction adjusting mechanism 15 such that the optical axis direction of the zoom lens 11 changes by a predetermined angle. This step S113 is executed if "NO" is determined in the immediately preceding step S112. Note that the amount of change in the optical axis direction of the zoom lens 11 in step S113 is set to be smaller than the above-described amount of change in the optical axis direction of the zoom lens 11 in step S108. Steps S111 and S113 are repeated until "YES" is determined in step S112.

The communication device 1 executes the above-described optical axis direction adjusting method S1, and then performs data communication with a communication device on a transmitting side, which is the signal light source, in a state where the focal length f of the zoom lens 11 is maximum.

Note that the present embodiment uses the optical axis direction adjusting mechanism 15 for the optical axis direction adjustment in step S108 (optical axis direction adjustment before the angle of view is minimized) and the optical axis direction adjustment in step S113 (optical axis direction adjustment after the angle of view is minimized). However, the present invention is not limited thereto. For example, the optical axis direction adjusting mechanism 15 (for example, a platform) may be used for the optical axis direction adjustment in step S108, and a tracking mechanism (for example, a vibration-proof group) that can perform finer adjustment with higher speed than the optical axis direction adjusting mechanism 15 may be used for the optical axis direction adjustment in step S113.

3. Execution Example of Optical Axis Direction ADJUSTING METHOD

Figure 3:
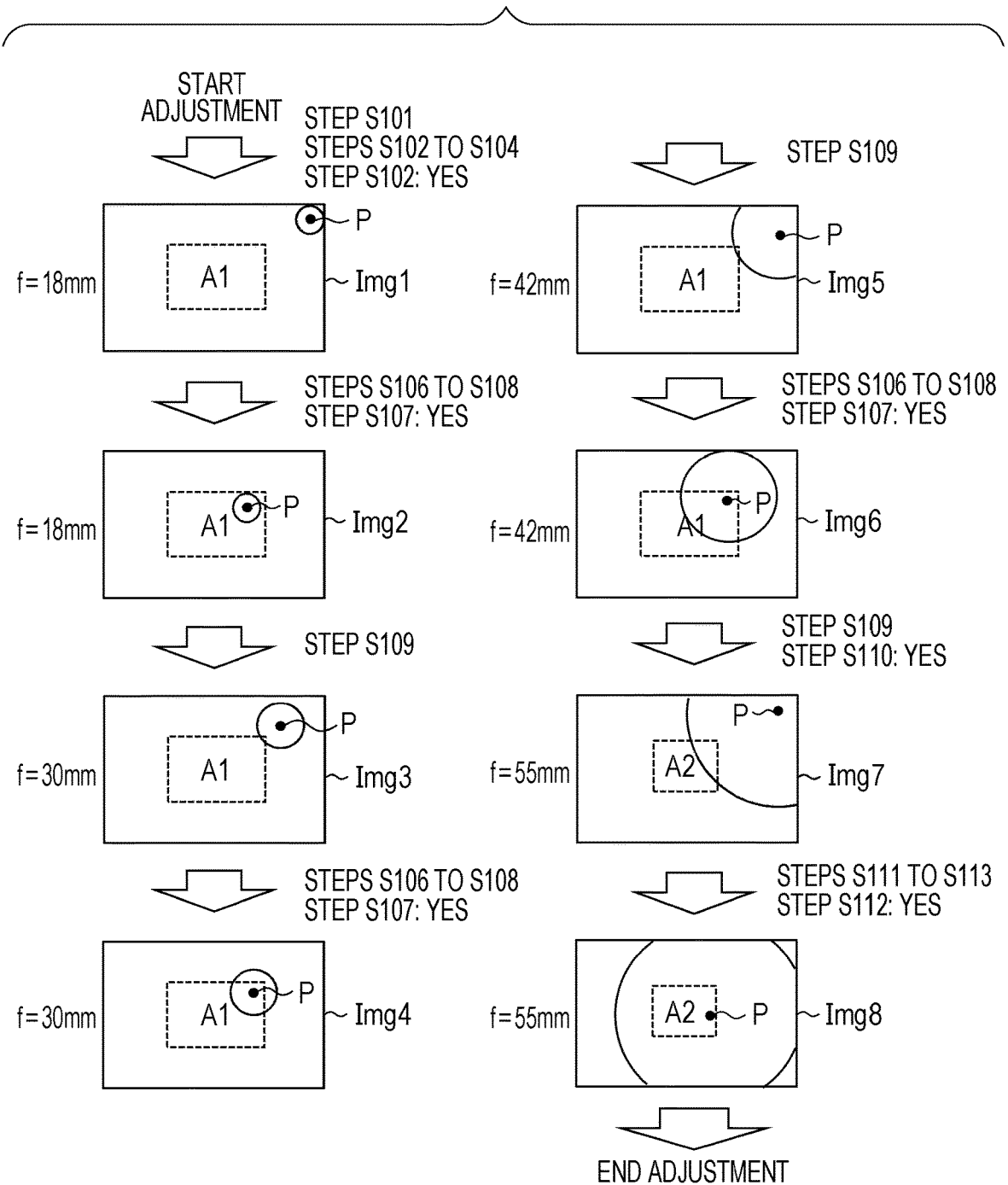
FIG. 3 is a transition diagram illustrating transition of an image represented by an output signal of a signal light detector included in the communication device of FIG. 1.

An execution example of the optical axis direction adjusting method S1 will be described with reference to FIG. 3. FIG. 3 is a transition diagram of an image represented by an output signal of the signal light detector 17 (hereinafter, referred to as "detection image"). In this execution example, the minimum value fmin of the focal length f of the zoom lens 11 is 18 mm, and the maximum value fmax thereof is 55 mm.

Step S101 for setting the focal length f of the zoom lens 11 to 18 mm is executed, then step S103 for changing the optical axis direction of the zoom lens 11 is repeated, and when it is determined that the signal light source is included in the angle of view in step S102, a detection image Img1 is obtained. At this time, the optical axis direction of the zoom lens 11 is close to the light source direction of the signal light SL to the extent that the signal light source is included in the angle of view in a state where the focal length f is 18 mm.

Thereafter, step S108 for changing the optical axis direction of the zoom lens 11 is repeated, and when it is determined that the position P of the signal light source is included in the region A1 in step S107, a detection image Img2 is obtained. At this time, the optical axis direction of the zoom lens 11 is close to the light source direction of the signal light SL to the extent that the signal light source is included in the region A1 in a state where the focal length f is 18 mm.

Thereafter, step S109 for changing the focal length f of the zoom lens 11 to 30 mm is executed, and then a detection image Img3 is obtained. It can be seen that the position P of the signal light source is outside the region A1 because the focal length f of the zoom lens 11 is shortened (the angle of view is narrowed).

Thereafter, step S108 for changing the optical axis direction of the zoom lens 11 is repeated, and when it is determined that the position P of the signal light source is included in the region A1 in step S107, a detection image Img4 is obtained. At this time, the optical axis direction of the zoom lens 11 is close to the light source direction of the signal light SL to the extent that the signal light source is included in the region A1 in a state where the focal length f is 30 mm.

Thereafter, step S109 for changing the focal length f of the zoom lens 11 to 42 mm is executed, and then a detection image Img5 is obtained. It can be seen that the position P of the signal light source is outside the region A1 because the focal length f of the zoom lens 11 is shortened (the angle of view is narrowed).

Thereafter, step S108 for changing the optical axis direction of the zoom lens 11 is repeated, and when it is determined that the position P of the signal light source is included in the region A1 in step S107, a detection image Img6 is obtained. At this time, the optical axis direction of the zoom lens 11 is close to the light source direction of the signal light SL to the extent that the signal light source is included in the region A1 in a state where the focal length f is 42 mm.

Thereafter, step S109 for changing the focal length f of the zoom lens 11 to 55 mm is executed, and then a detection image Img7 is obtained. It can be seen that the position. P of the signal light source is outside the region A2 because the focal length f of the zoom lens 11 is shortened. (the angle of view is narrowed).

Thereafter, step S113 for changing the optical axis direction of the zoom lens 11 is repeated, and when it is determined that the position P of the signal light source is included in the region A2 in step S112, a detection image Img8 is obtained. At this time, the optical axis direction of the zoom lens 11 is close to the light source direction of the signal light SL to the extent that the signal light source is included in the region A2 in a state where the focal length f is 55 mm.

4. Configuration of Communication System

Figure 4:
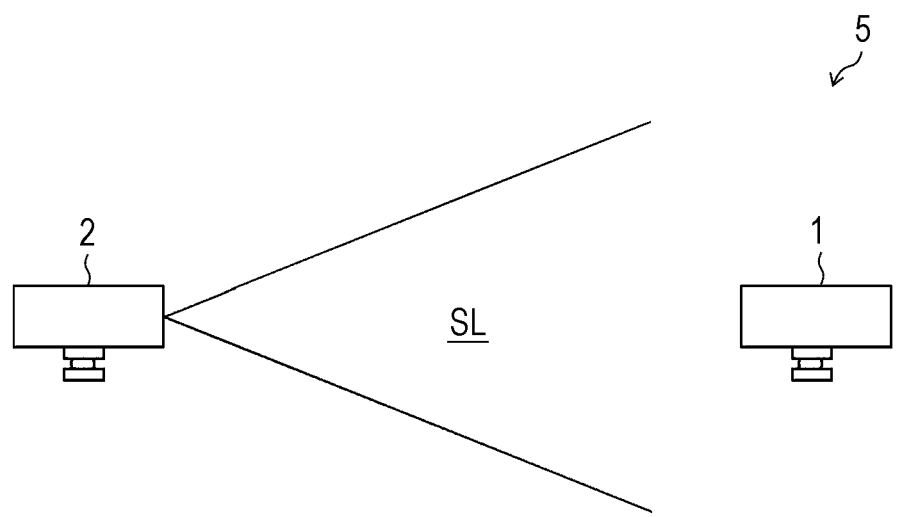
FIG. 4 is a configuration diagram illustrating a configuration of a communication system including the communication device of FIG. 1.

A configuration of a communication system 5 including the communication device 1 will be described with reference to FIG. 4. FIG. 4 is a configuration diagram illustrating the configuration of the communication system 5.

As illustrated in FIG. 4, the communication system 5 includes the communication device 1 and a communication device 2.

As described above, the communication device 1 is a device that receives the signal light SL. The communication device 2 is a device that transmits the signal light SL.

The communication device 2 transmits the signal light SL, which is divergent light, before starting data communication with the communication device 1. Therefore, if the communication device 1 exists in an optical cone of the signal light SL, by executing the above-described optical axis direction adjusting method S1, the optical axis direction of the zoom lens 11 can be brought closer to the light source direction of the signal light SL, that is, a direction in which the communication device 2 exists when viewed from the communication device 1. Note that examples of a timing at which such optical axis direction adjustment is performed include: (1) a timing at which one or both of the communication device 1 and the communication device 2 are newly installed or re-installed; and (2) a timing at which maintenance is performed on one or both of the communication device 1 and the communication device 2. It is also effective to adopt a configuration that keeps the accuracy of such optical axis direction adjustment at a certain level or higher by performing the optical axis direction adjustment regularly or automatically at a timing at which the communication quality deteriorates.

Note that the communication device 1 may have a similar transmission function to the communication device 2. The communication device 2 may have a similar reception function to the communication device 1. In this case, bidirectional communication can be achieved between the communication device 1 and the communication device 2.

In the communication system 5, the signal light. SL used for performing optical axis direction adjustment may have the same wavelength as or a different wavelength from the signal light SL used for performing communication. In this case, in the communication device 1, an optical path of the signal light used for performing optical axis direction adjustment may be different from an optical path of the signal light used for performing communication. Such an optical system can be easily achieved using a prism having a different refraction angle depending on a wavelength, a half mirror having a different transmittance and reflectance depending on a wavelength, and the like. In this case, the signal light SL used for performing optical axis direction adjustment in the atmosphere is preferably, for example, light having a wavelength of 800 nm or more, and particularly preferably light having a wavelength of 1400 nm or more from a viewpoint of eye safety. The signal light SL used for performing communication in the atmosphere is preferably, for example, light having a wavelength of 1000 nm or more and 1650 nm or less. As a result, optical axis direction adjustment can be performed while communication is performed. Therefore, it is possible to deal with, for example, a deviation in the optical axis direction that occurs during communication. Note that when the communication system 5 is installed on the seabed and used, light belonging to a wavelength band of 400 nm or more and 550 nm or less is preferably used as the signal light SL. In this case, the wavelength band of 400 nm or more and 550 nm or less may be divided into two wavelength bands, one wavelength band may be used for performing optical axis direction adjustment, and the other wavelength band may be used for performing communication.

5. Characteristics and Effects of Communication Device, Optical Axis Direction Adjusting Methods, and Communication System As described above, the communication device 1 according to the present embodiment includes the zoom lens 11 having a variable focal length as a lens for collecting the signal light SL.

Therefore, by increasing the focal length (narrowing the angle of view) of the zoom lens 11, it is easy to finely adjust the optical axis direction of the lens, which is difficult with a communication device including a wide-angle lens having a short focal length. By decreasing the focal length (widening the angle of view) of the zoom lens 11, it is easy to coarsely adjust the optical axis direction of the lens, which is difficult with a communication device including a telephoto lens having a long focal length.

The communication device 1 according to the present embodiment further includes the focal length adjusting mechanism 14 that adjusts the focal length of the zoom lens 11, the optical axis direction adjusting mechanism 15 that adjusts the optical axis direction of the zoom lens 11, and the control circuit 18 that controls the focal length adjusting mechanism 14 such that the focal length during adjustment of the optical axis direction of the zoom lens 11 is shorter than the focal length during communication, and then controls the optical axis direction adjusting mechanism 15 such that the optical axis direction of the zoom lens 11 approaches the light source direction of the signal light SL.

Therefore, even if the signal light source exists at a position not included in the angle of view in a state where the focal length of the zoom lens 11 is the same as the focal length during communication, the optical axis direction of the zoom, lens 11 can be automatically brought closer to the light source direction of the signal light SL.

The communication device 1 according to the present embodiment further includes the signal light detector 17 that detects the signal light SL that has passed through the zoom lens 11, and the control circuit 18 specifies the light source direction of the signal light SL with reference to an output signal of the signal light detector 17.

Therefore, the light source direction of the signal light SL can be easily specified.

In the communication device 1 according to the present embodiment, the signal light SL is visible light or infrared light.

Therefore, the communication device 1 can be used without being restricted by the Radio Law unlike a communication device using a radio wave. The communication device 1 can use an optical component for a camera (visible light camera or infrared light camera), and therefore manufacturing cost of the communication device 1 can be easily reduced. Particularly when the signal light SL is visible light, a risk of unexpected communication interception can be reduced as compared with a communication device using light that does not belong to a visible light region.

The optical axis direction adjusting method S1 according to the present embodiment is an optical axis direction adjusting method for adjusting the optical axis direction of the zoom lens 11 in the communication device 1 including the zoom lens 11 that collects the signal light SL. The optical axis direction adjusting method S1 according to the present embodiment includes step S101 for making the focal length during adjustment of the optical axis direction of the zoom lens 11 shorter than the focal length during communication, and step S103 for bringing the optical axis direction of the zoom lens 11 closer to the light source direction of the signal light SL after step S101 is performed.

Therefore, even if the light source of the signal light SL exists at a position not included in the angle of view in a state where the focal length of the zoom lens 11 is the same as the focal length during communication, the optical axis direction of the zoom lens 11 can be automatically brought closer to the light source direction of the signal light SL.

The communication system 5 according to the present embodiment includes a first communication device that receives the signal light SL and a second communication device that transmits the signal light SL, and the first communication device is the communication device 1 described above.

Therefore, by increasing the focal length (narrowing the angle of view) of the zoom lens 11, it is easy to finely adjust the optical axis direction of the lens (zoom lens 11 in the present embodiment), which is difficult with a communication device including a wide-angle lens having a short focal length. By decreasing the focal length (widening the angle of view) of the zoom lens 11, it is easy to coarsely adjust the optical axis direction of the lens (zoom lens 11 in the present embodiment), which is difficult with a communication device including a telephoto lens having a long focal length.

5. Appendix

The present invention is not limited to the above-described embodiment. Various modifications can be made within the scope of the claims, and other embodiments obtained by appropriately combining the technical means disclosed in the above-described embodiment are also included in the technical scope of the present invention.

What is claimed is:

1. A communication device comprising:
   a zoom lens having a variable focal length as a lens for collecting signal light;
   a focal length adjusting mechanism that adjusts a focal length of the zoom lens;
   an optical axis direction adjusting mechanism that adjusts an optical axis direction of the zoom lens; and
   a control circuit that controls the focal length adjusting mechanism such that the focal length of the zoom lens is made to be a minimum value, and then controls the optical axis direction adjusting mechanism such that the optical axis direction of the zoom lens approaches a light source direction of the signal light.

2. The communication device according to claim 1, further comprising a signal light detector that detects signal light that has passed through the zoom lens, wherein
   the control circuit specifies the light source direction of the signal light with reference to an output signal of the signal light detector.

3. The communication device according to claim 1, wherein
   the signal light is visible light or infrared light.

4. A communication system comprising a first communication device that receives signal light and a second communication device that transmits the signal light, wherein
   the first communication device is the communication device according to claim 1.

5. An optical axis direction adjusting method for adjusting an optical axis direction of a zoom lens that collects signal light in a communication device including the zoom lens, the method comprising:
   making a focal length of the zoom lens to be a minimum value; and
   bringing the optical axis direction of the zoom lens closer to a light source direction of the signal light after the focal length of the zoom lens is made to be the minimum value.

\* \* \* \* \*